US012754818B2

(12) United States Patent
Backhus et al.

(10) Patent No.: US 12,754,818 B2
(45) Date of Patent: Oct. 6, 2026

(54) DIFFERENCED DATA-BASED "WHAT IF" SIMULATION SYSTEM

(71) Applicant: Hitachi, Ltd., Tokyo (JP)

(72) Inventors: Jana Backhus, San Jose, CA (US); Yasutaka Kono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1144 days.

(21) Appl. No.: 17/750,202

(22) Filed: May 20, 2022

(65) Prior Publication Data

US 2023/0376400 A1 Nov. 23, 2023

(51) Int. Cl.

*G06F 11/34* (2006.01)
*G06F 11/30* (2006.01)
*G06F 11/32* (2006.01)
*G06N 20/00* (2019.01)

(52) U.S. Cl.

CPC ...... *G06F 11/3457* (2013.01); *G06F 11/3058* (2013.01); *G06F 11/328* (2013.01); *G06N 20/00* (2019.01)

(58) Field of Classification Search

CPC ............. G06F 11/3457; G06F 11/3058; G06F 11/328; G06N 20/00

See application file for complete search history.

(56) References Cited

U.S. PATENT DOCUMENTS 11,087,041 B2 8/2021 Newcombe et al.
2008/0288193 A1* 11/2008 Claassen ............ H05K 7/20836 702/61
2018/0024578 A1* 1/2018 Ahuja ..................... G06F 1/206 700/300
2020/0389371 A1* 12/2020 Tedaldi ................... H04L 45/28
2022/0134116 A1* 5/2022 Fried .................. A61N 1/36125 607/116

OTHER PUBLICATIONS

Kavikondala, Akanksha, et al. "Automated retraining of machine learning models." International Journal of Innovative Technology and Exploring Engineering 8.12 (2019): 445-452 (Year: 2019).*
Zhang, Kaicheng, et al. "Minimizing thermal variation across system components." 2015 IEEE International Parallel and Distributed Processing Symposium. IEEE, 2015. (Year: 2015).*
Zhang, Kaicheng, et al. "Machine learning-based temperature prediction for runtime thermal management across system components." IEEE Transactions on parallel and distributed systems 29.2 (2017): 405-419. (Year: 2017).*

* cited by examiner

*Primary Examiner* — Saif A Alhija
(74) *Attorney, Agent, or Firm* — PROCOPIO, CORY, HARGREAVES & SAVITCH LLP

(57) ABSTRACT

A method for generating simulations based on data. The method may include receiving internal data and external data which affect output data; differencing the internal data, the external data, and the output data to create first differenced data; training a machine learning model using the first differenced data: receiving scenario input data as input to the machine learning model, wherein the scenario input data comprises conditional data input from a user and/or input data obtained from a separately simulated machine learning data change model, the conditional data input including at least one feature dimension associated with at least one of the internal data or the external data, and the input data including at least one feature dimension associated with at least one of the internal data or the external data; and generating predicted output based on the scenario input data.

18 Claims, 12 Drawing Sheets

Test results (Root mean squared error=RMSE):

Comparison of differenced data VS. direct data approach

The smaller the error (RMSE) the better the performance of the model

| | RMSE | |
|---|---|---|
| rmse_diff_2020-01-31 | 78.797118 | 2 month of training data |
| rmse_direct_2020-01-31 | 139.251486 | |
| rmse_diff_2020-03-31 | 75.122576 | 4 month of training data |
| rmse_direct_2020-03-31 | 91.569389 | |
| rmse_diff_2020-05-31 | 69.223215 | 6 month of training data |
| rmse_direct_2020-05-31 | 93.224424 | |
| rmse_diff_2020-07-31 | 59.478361 | 8 month of training data |
| rmse_direct_2020-07-31 | 81.280181 | |
| rmse_diff_2020-09-31 | 50.707368 | 10 month of training data |
| rmse_direct_2020-09-31 | 71.315611 | |
| rmse_diff_2020-11-31 | 47.934972 | 12 month of training data |
| rmse_direct_2020-11-31 | 59.296618 | |

FIG. 7

Power grouping information table 1002

| Grouping Type ID | Grouping granularity | Information table |
|---|---|---|
| 1 | Room sub-group | Table A-1 |
| 2 | Room | Table A-2 |
| 3 | Room Group | Table A-3 |
| 4 | Floor | Table A-4 |
| 5 | Room Building | Table A-5 |

Data management table 1004

| Sensor ID | Sensor Type | Grouping ID | Data table ID | Dependent feature? | Max value (e.g. panel capacity) |
|---|---|---|---|---|---|
| 1 | Server power | 1-1 | Table D-1 | No | 500 |
| 2 | A/C power | 1-1 | Table D-2 | Yes | 400 |
| 3 | Indoor temperature | 2-2 | Table D-3 | No | / |
| ... | ... | ... | ... | ... | ... |
| N | Indoor humidity | 2-N | Table D-N | No | / |

Power grouping relationship table (example for table A-2) 1006

| Group ID | Grouping granularity | Next layer ID |
|---|---|---|
| 1 | Room 1 | 3-1 |
| 2 | Room 2 | 3-2 |
| 3 | Room 3 | 3-2 |
| ... | ... | ... |
| N | Room N | 3-5 |

Data table (example for table D-1) 1008

| Datetime | Data value | Data unit |
|---|---|---|
| 2020-01-01 00:00:00 | 120 | kWh |
| 2020-01-01 01:00:00 | 110 | kWh |
| 2020-01-01 02:00:00 | 105 | kWh |
| ... | ... | ... |
| 2020-12-31 23:00:00 | 80 | kWh |

FIG. 10

Data Management Table 1102

| Data entry ID | Data grouping granularity | Operation mode table ID | Differenced Data Table ID |
|---|---|---|---|
| 1 | Room | TableO_01 | Table_001 |
| 2 | Room-group | TableO_02 | Table_002 |
| ... | ... | ... | ... |
| N | Building | TableO_NN | Table_NNN |

Model Management Table 1104

| Model ID | Model | Input features | Output features |
|---|---|---|---|
| 1 | Linear regression model | [server power, outdoor air temperature] | [cooling power] |
| 2 | Theil-Sen Regressor | [outdoor air temperature] | [cooling power] |
| ... | ... | ... | ... |
| N | MLP | [server power, outdoor air temperature, indoor humidity, indoor temperature] | [cooling power] |

Operation Mode Table (ex.: TableO_01) 1106

| Operation Mode ID | Operation mode time frames | Model ID | Baseline ID |
|---|---|---|---|
| A | [(2020-01-01 00:00:00, 2020-01-01 12:00:00), (2020-10-01 18:00:00, 2021-12-31 18:00:00)] | 1 | 2 |
| B | [(2020-06-01 12:00:00, 2020-10-01 18:00:00)] | 2 | 1 |
| ... | ... | ... | ... |

Difference Data Table (example: Table_001) 1108

| Datetme | Server Power | Outdoor air temperature | Cooling power | Indoor temperature | Indoor humidity | Outdoor humidity |
|---|---|---|---|---|---|---|
| 2020-01-01 00:00:00 | -150 | -2 | -20 | +0.1 | -1 | -4 |
| 2020-01-01 06:00:00 | +30 | +4 | +50 | +0.5 | +4 | +5 |
| 2020-01-01 12:00:00 | +50 | +2 | +40 | -0.2 | -3 | -2 |
| ... | ... | ... | ... | ... | ... | ... |
| 2020-12-31 18:00:00 | -50 | -3 | -32 | +0.6 | +2 | -4 |

Baseline management table 1110

| Baseline ID | Baseline type | Baseline value table ID |
|---|---|---|
| 1 | Holiday/workday | Base_Table_001 |
| 2 | Date-based | Base_Table_002 |
| ... | ... | ... |
| N | One-value | Base_Table_NNN |

Baseline value table (example: Base_Table_002) 1112

| Featured time | Cooling power | Server Power | Outdoor air temperature | Indoor temperature | Indoor humidity | Outdoor humidity |
|---|---|---|---|---|---|---|
| Apr 1, 12am | 100 | 300 | 6 | 22 | 50 | 35 |
| Apr, 1 6am | 120 | 350 | 9 | 22.5 | 49 | 33 |
| Apr 1, 12pm | 200 | 500 | 18 | 23 | 51 | 34 |
| Apr 1, 6pm | 180 | 400 | 12 | 21.9 | 50 | 38 |
| ... | ... | ... | ... | ... | ... | ... |
| Dec 31, 6am | 50 | 350 | 3 | 20 | 52 | 25 |
| Dec 31, 12pm | 80 | 500 | 7 | 20.2 | 51 | 24 |
| Dec 31, 6pm | 100 | 400 | 5 | 19.8 | 53 | 20 |

FIG. 11

DIFFERENCED DATA-BASED "WHAT IF" SIMULATION SYSTEM

BACKGROUND

Field

The present disclosure is generally directed to a method and a system of simulation generation, and more specifically, to a method of generating simulations based on differenced data.

Related Art

With the globally increasing demand in digital services, the data center (DC) market has been growing rapidly over the past decade. Many DC-related information and communications technology (ICT) companies have started investing in renewable energy (RE) to decarbonize their DCs and boost company reputations with newly achieved sustainability goals. A significant share of renewable energy procurement is conducted through power purchase agreements (PPA) where the ICT companies' goal is to match 100% of their operational electricity consumption with RE purchases. For example, several companies have taken the initiative with matching of global power usage for all of its operations with renewable power sources. These power purchases must be well planned in advance for a longer time span and often involve the construction of new RE production sites and long-term commitments with power utility providers. On the other hand, the power usage of DCs is continuously changing according to fluctuating user demand and operation changes (e.g. increase in server racks). Since RE power cannot be purchased flexibly on demand, it is necessary to plan approximated power usage ahead of time and simulate eventual changes in DC power usage based on DC infrastructure data.

In the related art, various types of simulations are conducted based on a logical presentation of DC including a plurality of nodes representing DC devices, e.g. servers, and a set of functions to calculate simulation outputs from input data. The simulator can assess e.g. the DC efficiency, impact of different IT devices, or energy cost based on a broad range of 'what if' analysis. The simulations depend heavily on detailed data inputs and given definitions of DC representations as well as a set of dependency functions. However, DC operators may lack such detailed information (e.g. data on server-level) or have difficulties coming up with dependency functions. Therefore, a more flexible approach for 'what if' simulations is needed.

SUMMARY

Aspects of the present disclosure involve an innovative method for generating simulations based on data. The method may include receiving internal data and external data which affect output data; differencing the internal data, the external data, and the output data to create first differenced data; training a machine learning model using the first differenced data; receiving scenario input data as input to the machine learning model, wherein the scenario input data comprises conditional data input from a user and/or input data obtained from a separately simulated machine learning data change model, the conditional data input including at least one feature dimension associated with at least one of the internal data or the external data, and the input data including at least one feature dimension associated with at least one of the internal data or the external data; and generating predicted output based on the scenario input data.

Aspects of the present disclosure involve an innovative non-transitory computer readable medium, storing instructions for generating simulations based on data. The instructions may include receiving internal data and external data which affect output data; differencing the internal data, the external data, and the output data to create first differenced data; training a machine learning model using the first differenced data; receiving scenario input data as input to the machine learning model, wherein the scenario input data comprises conditional data input from a user and/or input data obtained from a separately simulated machine learning data change model, the conditional data input including at least one feature dimension associated with at least one of the internal data or the external data, and the input data including at least one feature dimension associated with at least one of the internal data or the external data; and generating predicted output based on the scenario input data.

Aspects of the present disclosure involve an innovative server system for generating simulations based on data. The server system may include receiving internal data and external data which affect output data; differencing the internal data, the external data, and the output data to create first differenced data; training a machine learning model using the first differenced data; receiving scenario input data as input to the machine learning model, wherein the scenario input data comprises conditional data input from a user and/or input data obtained from a separately simulated machine learning data change model, the conditional data input including at least one feature dimension associated with at least one of the internal data or the external data, and the input data including at least one feature dimension associated with at least one of the internal data or the external data; and generating predicted output based on the scenario input data.

Aspects of the present disclosure involve an innovative system for generating simulations based on data. The system can include means for receiving internal data and external data which affect output data; means for differencing the internal data, the external data, and the output data to create first differenced data; means for training a machine learning model using the first differenced data; means for receiving scenario input data as input to the machine learning model, wherein the scenario input data comprises conditional data input from a user and/or input data obtained from a separately simulated machine learning data change model, the conditional data input including at least one feature dimension associated with at least one of the internal data or the external data, and the input data including at least one feature dimension associated with at least one of the internal data or the external data; and means for generating predicted output based on the scenario input data.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 7 illustrates performance test results for comparing ML modeling approaches with differenced data and direct data.

FIG. 10 illustrates example of internal data, in accordance with an example implementation.

FIG. 11 illustrates example information stored at the data, ML model & baseline management database, in accordance with an example implementation.

DETAILED DESCRIPTION

Figure 1:
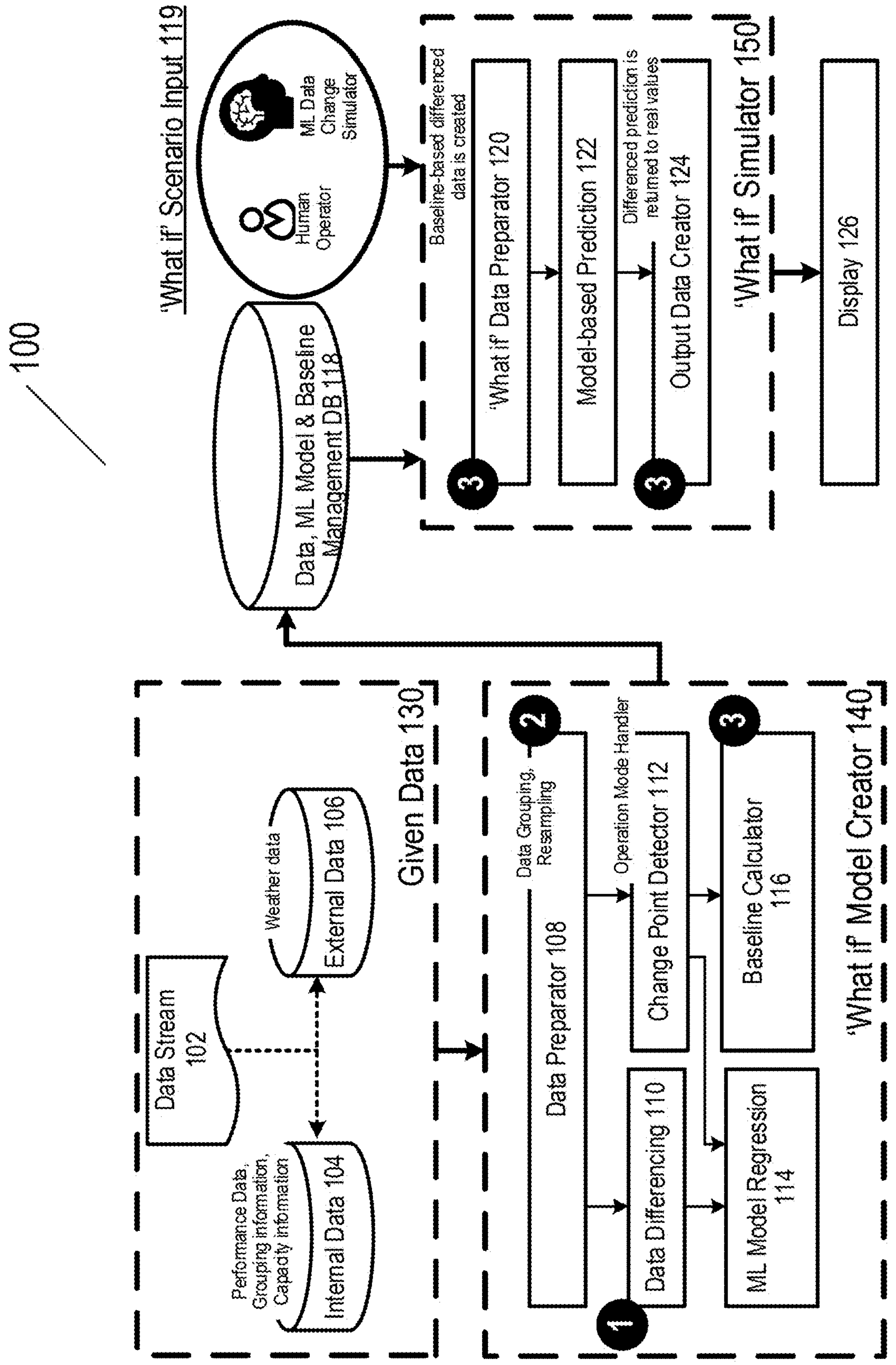
FIG. 1 illustrates an example differenced data-based 'what if' simulation system, in accordance with an example implementation.

The following detailed description following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example differenced data-based 'what if' simulation system, in accordance with an example implementation. In the example differenced data-based 'what if' simulation system 100, there is given data 130, 'what if' model creator 140, data, ML (machine learning) model & baseline management DB (database) 118, 'what if' simulator 150, and a display 126. Given data 130 serves as input to the 'what if' model creator 140 to generate a ML model, and contains data stream 102. Data stream 102 relates to data associated with a DC infrastructure and can be further divided into internal data 104 and external data 106. Internal data 104 may include internal DC infrastructure management data such as performance data, grouping information, capacity information, and etc. External data 106 may include data external to the DC infrastructure such as weather data and etc. that impact the operation of the DC infrastructure. Internal data 104 and external data 106 affect output data. In the context of DC infrastructure, output data may relate to power associated with cooling of the DC infrastructure In some example implementations, the data stream 102 relates to power data for cooling of the DC infrastructure. In such scenario, server power consumption and outdoor air temperature may be used as input data features to create the ML model, and predictions on cooling power consumption are generated as the model output feature.

The 'what if' model creator 140 comprises a data preparator 108, a data differencing unit 110, a change point detector 112, a ML model regression 114, and a baseline calculator 116. The 'what if' model creator 140 uses given data 130 as training data to create the ML model. In some example implementations, a number of ML models may be generated based on data input. The analyzed data and trained ML models can be stored in the data, ML model & baseline management DB 118 for subsequent use in the 'what if' simulator 150.

The data preparator 108 receives the given data 130 and a resampling process may be performed to determine an effective time sampling frequency having the best correlation distribution. In some example implementations, the data preparator 108 may group data according to available internal layout data provided as part of the internal data 104. Available internal layout data may include floor level, building number, shared power panels, room number, and so on, in accordance with the desired implementation. Data grouping ensures the same data granularity level is applied to available data. At the same time, making the use of 'what if' simulator 150 more flexible as different ML models can be built based on the different data granularities. After the data has been grouped and resampled, it is then processed at the data differencing unit 110 and the change point detector 112.

The change point detector 112 detects change points in the data. Change points detection may include detection of changes in operation mode. For instance, cooling power data tend to show changes in operation mode leading to changes in relationship with server power or outdoor temperature. Change points can be detected using change point detection methods. For example, by observing changes in mean and variance of each time series or by observing the change of modeling error of machine learning models.

The data differencing unit 110 produces differenced data of the internal data 104, external data 106, and output data based on time information. The differencing of data eliminates noisy ups and downs from data and helps to establish the underlying relationship more clearly. For example, difference between data at time step t and t−1 is $x(t)-x(t-1)$. Where training data for ML modeling is limited, available amount of data can be increased by difference between several time steps (e.g. $x(t)-x(t-1)$, $x(t)-x(t-2)$, and etc.)

The ML model regression 114 receives outputs from the data differencing unit 110 and the change point detector 112 as inputs and builds/trains ML model based on the inputs. The generated ML models are then stored in the data, ML model & baseline management DB 118 and can be retrieved by the 'What if' simulator 150 for later use.

The baseline calculator 116 calculates one or more baselines for each of the ML model generated. Change points from the change point detector 112 are used as inputs to the baseline calculator 116 in generating the one or more baselines. Baselines may be obtained on different temporal characteristics as necessary. The baselines are then stored in the data, ML model & baseline management DB 118 and can be retrieved by the 'What if' simulator 150 for later use.

The 'what if' simulator 150 conducts simulations based on the trained ML model obtained from the 'what if' model creator 140. Simulations are performed by receiving new input data in the form of 'what if' scenario input 119. 'What if' scenario input 119 may include data stream, input from human operator, output from a ML data change simulator, and etc. In some example implementations, the 'what if' scenario input 119 may include a combination of data stream, input from human operator, and output from a ML data change simulator. The data stream, the input from human operator, and the output from the ML data change simulator all include at least one feature dimension associated with at least one of the internal data or the external data. The ML data change simulator is a ML learning model that makes predictions on future states. The 'what if' simulator 150 includes a 'what if' data preparator 120, model-based prediction 122, and an output data creator 124.

At the 'what if' data preparator 120, the data of the 'what if' scenario input 119 is received and processed to conform with processing format accepted by the trained ML model. Data processing may include data grouping, resampling, and so on in accordance with the desired implementation. In some example implementations, if the data associated with the 'what if' scenario input 119 are real values, the 'what if' data preparator 120 performs data differencing on the data using the at least one baselines calculated from the baseline calculator 116. In some example implementations, if the data associated with the 'what if' scenario input 119 is already differenced, the data can be used directly without the need to apply the at least one baselines calculated from the baseline calculator 116.

The processed data from the 'what if' data preparator 120 is then fed into the model-based prediction 122 as input for the trained ML model to predict changes in the output data features. The ML model simulates relationships between independent input features and dependent output features. In some example implementations, the ML model is trained to predict output feature of cooling power consumption based on impact of the input features server power and outdoor air temperature. For example, a server power increase of 50 and an outdoor air temperature increase of 10 could lead to a cooling power increase of 20. The input features may include but not limited to internal room temperature, internal room humidity, external humidity, weather data, server heat, server power consumption associated with a data center, and etc. The output features may include cooling power consumption associated with the data center, speed of an AC motor or ventilator in associated with operation of the data center, and etc.

The output data creator 124 obtains the predicted changes from the model-based prediction 122 and provides simulation output for the 'what if' simulator 150. Prior to outputting, the predicted changes must be returned to real values by adding the at least one baseline calculated from the baseline calculator 116. The type of baseline can be dependent on the type of data and its temporal characteristics. Once the 'what if' simulator 150 generates a simulation output, the output is provided to the display 126 to be displayed.

The foregoing example implementation may have various benefits and advantages. For example, flexible handling of different types of relationships between data without any prior definition of the relationships can be achieved by inferring only relationship between data feature dimensions based on available data and ML modeling. In addition, data differencing is more efficient when dealing with changes in operation mode, as the differenced data-based relationship between input and output data features often remain the same while only the baseline value changes. Data grouping also provides the additional advantage of making the 'what if' simulator more flexible as ML models for different data granularities can be built.

Figure 2:
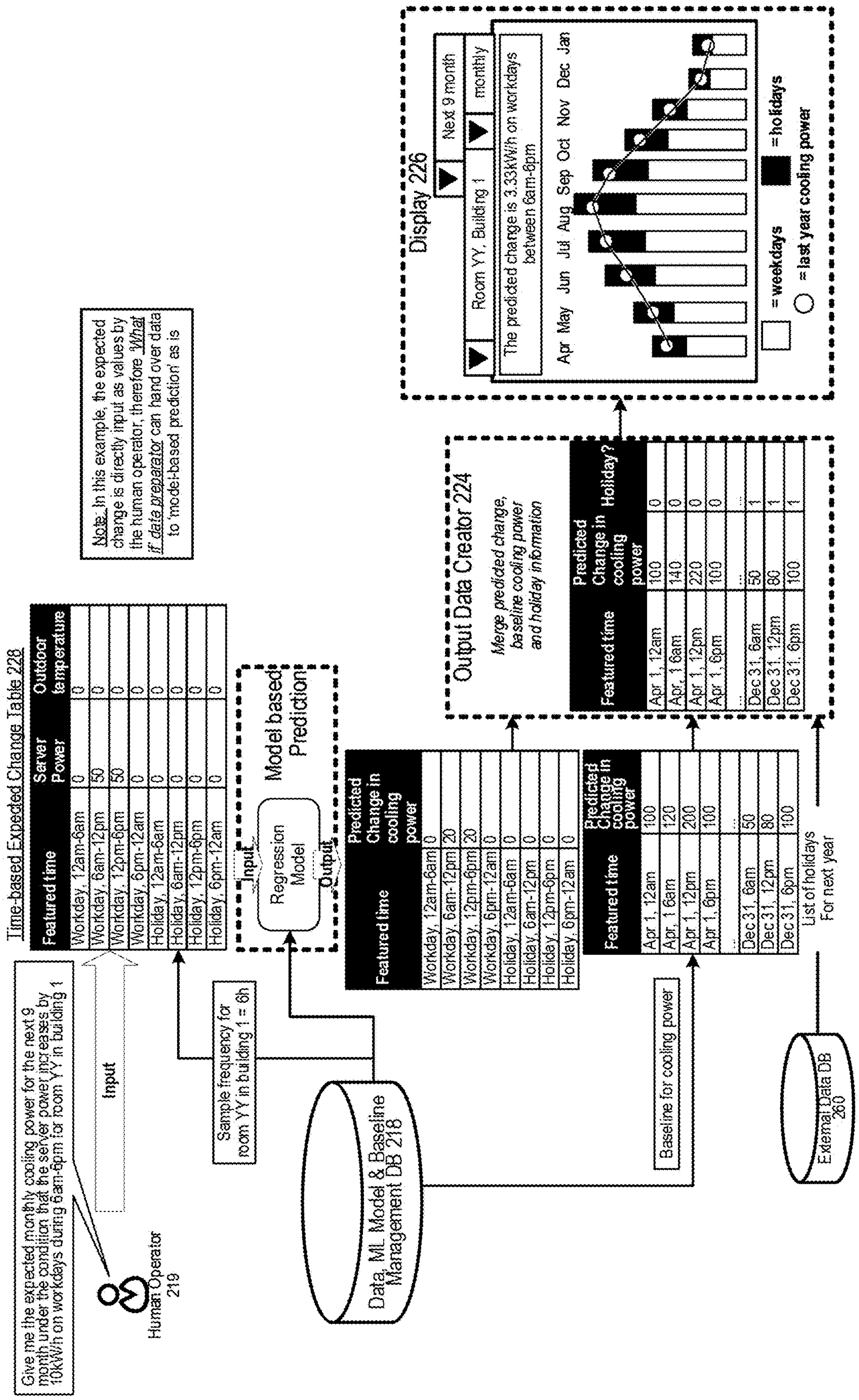
FIG. 2 illustrates an example process flow of the 'what if' simulator, in accordance with an example implementation.

FIG. 2 illustrates an example process flow of the 'what if' simulator 150, in accordance with an example implementation. A human operator 219 provides conditions as input to the 'what if' simulator 150. The trained ML model generated from the 'what if' model creator 140 is stored in the data, ML model & baseline management DB 218 and retrieved for prediction generation at the 'what if' simulator 150. In FIG. 2, "Give me the expected monthly cooling power for the next 9 months under the condition that the server power increases by 10 kW/h on workdays during 6 am-6 pm for room YY in building 1" is provided by the human operator 219 as the input.

A time-based expected change table 228 is generated based on resampling and grouping of the input as performed by the 'what if' data preparator 120. The input is resampled at the 6 h interval and grouped based on room YY in building 1. The time-based expected change table exhibits a relationship between featured time in resampled intervals, server power, and outdoor temperature. As shown in FIG. 2, the server power during workday hours of 6 am-6 pm is adjusted based on the input. In this example, the expected change is directly inputted as values by the human operator and not as the server power in real values, therefore the what if data preparator 120 can handle the input as is without differencing the input using the at least one baselines calculated from the baseline calculator 116.

The time-based expected change table 228 serves as input to the retrieved trained ML model to generate model-based predictions. As illustrated in FIG. 2, the correlation between feature time and predicted change in cooling power is generated as prediction output from the trained ML model. Following the generation of predicted change in cooling power, baselines stored in the data, ML model & baseline management DB 218 for cooling power are retrieved and merged with the generated predictions. In this example, the baselines for the workday April 1, have the values of 100, 120, 200, and 100 respectively for the four 6 h intervals. The baselines for the entire nine months period are merged with the generated predictions to create merged predictions. In the example, for the full day of April 1, baselines are added to the predictions and result in predicted changes in cooling power of 100, 140, 220, and 110 respectively for the four 6 h intervals.

In some example implementations, an external data DB 260 may provide additional information such as listing of holidays for the next year. Output data creator 224 takes the holiday information and merges the holiday information with the merged predictions to identify upcoming holidays over the nine months period. The merged predictions are then displayed on display 226, which is explained in further detail below.

Figure 3:
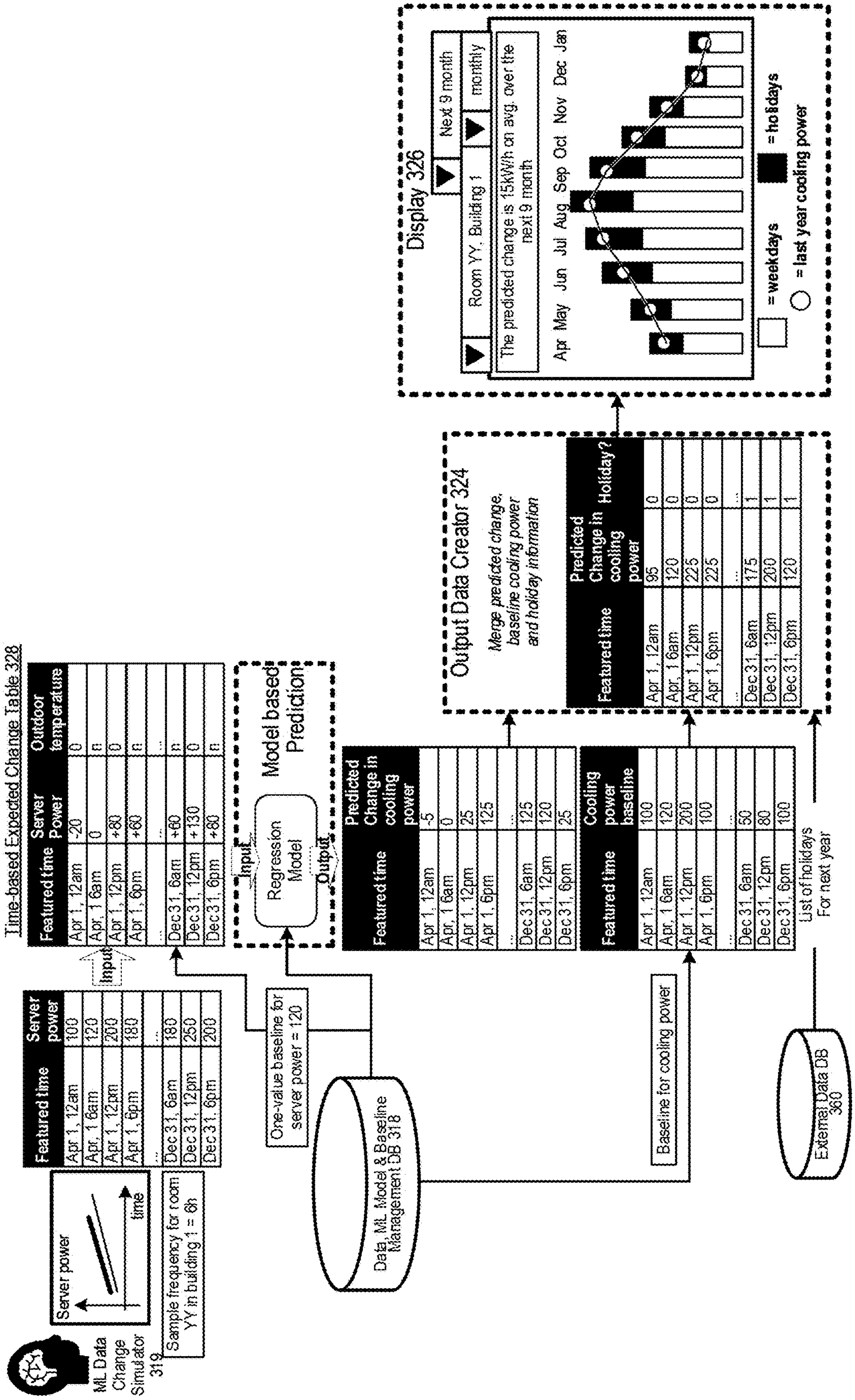
FIG. 3 illustrates an alternative process flow of the 'what if' simulator 150, in accordance with an example implementation.

FIG. 3 illustrates an alternative process flow of the 'what if' simulator 150, in accordance with an example implementation. A ML data change simulator 319 generates predicted future states through a ML learning model and provides the predicted future states as input to the 'what if' simulator 150. As illustrated in FIG. 3, the ML data change simulator 319 generates featured time for a period of nine months and makes predictions on server power. The trained ML model generated from the what if model creator 140 is stored in the data, ML model & baseline management DB 318 and retrieved for prediction generation at the 'what if' simulator 150.

A time-based expected change table 328 is generated by differencing the input using the at least one baselines calculated from the baseline calculator 116. The differencing is performed by the 'what if' data preparator 120. As illustrated in FIG. 3, a one-value baseline for server power is applied to the input and the one-value baseline is subtracted from all entries of server power of the input. For example, for the featured time of "April 1, 12 am", the associated server power of the input is 100. After data differencing is performed on the server power, the associated server power entry in the time-based expected change table 328 now becomes −20. The time-based expected change table exhibits a relationship between featured time in sampled intervals, server power, and outdoor temperature.

The time-based expected change table 328 serves as input to the retrieved trained ML model to generate model-based predictions. As illustrated in FIG. 3, the correlation between feature time and predicted change in cooling power is generated as the prediction output from the trained ML model. Following the generation of predicted change in cooling power, baselines stored in the data, ML model & baseline management DB 318 for cooling power are retrieved and merged with the generated predictions. In this example, the baselines for the workday April 1, have the values of 100, 120, 200, and 100 respectively for the four 6 h intervals. The baselines for the entire nine months period are merged with the generated predictions to create merged predictions. In the example, for the full day of April 1, baselines are added to the predictions and result in predicted changes in cooling power of 95, 120, 225, and 225 respectively for the four 6 h intervals.

In some example implementations, an external data DB 360 may provide additional information such as listing of holidays for the next year. Output data creator 324 takes the holiday information and merges the holiday information with the merged predictions to identify upcoming holidays over the nine months period. The merged predictions are then displayed on display 326, which is explained in further detail below.

Figure 4:
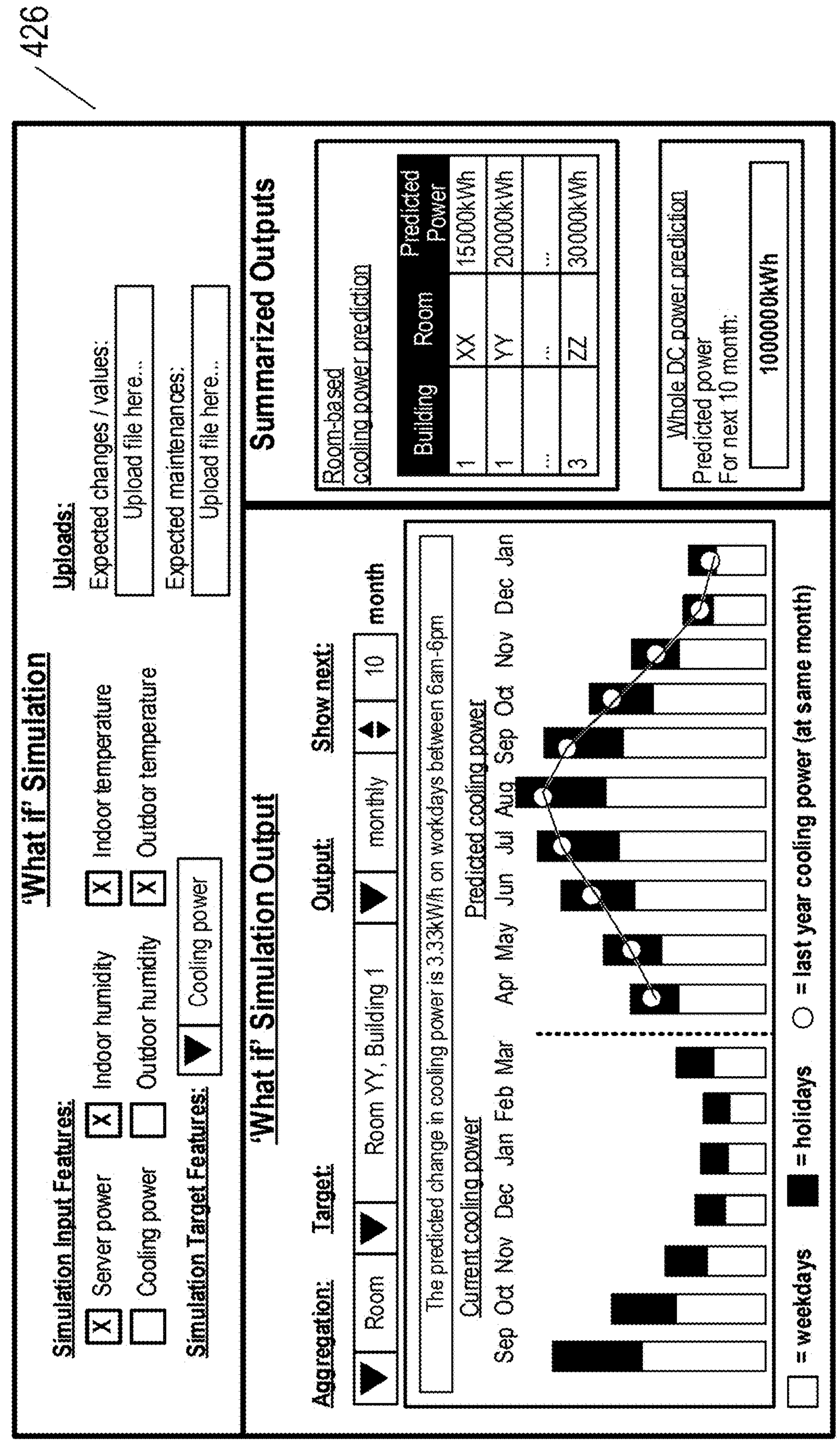
FIG. 4 illustrates an example display, in accordance with an example implementation.

FIG. 4 illustrates an example display, in accordance with an example implementation. The display 426 is a graphic user interface (GUI) that includes display areas of 'what if' simulation, 'what if' simulation output, and summarized outputs. The 'what if' simulation area allows users to designate (select) simulation input features and simulation target features for the simulation. In addition to feature designations, information on expected changes/values, as well as expected maintenances can be uploaded to help provide additional data in simulation output generation.

The 'what if' simulation output area generates simulation output based on user defined inputs such as aggregation type, target, output type, and number of period ("Show next"). As illustrated in FIG. 4, the aggregation type is selected as "Room", the target is selected as "Room YY, Building 1", the output type is selected as "monthly", and the number of period is selected as "10" for a period of 10 months. In some example implementations, a bar graph is generated showing current cooling power and predicted cooling power based on the simulation. Current cooling power represents power consumed as observed through past power usage. Predicted cooling power illustrates simulated predictions based on user inputs. As illustrated in FIG. 4, the bar graph can show additional features including but not limited to data comparison of predict power usage against same period in the past year, graphic display of weekday/holiday ratios, and etc.

Summarized outputs area shows summaries of predicted outputs generated through model simulation. In the provided example, the cooling power prediction is room-based due to the selected aggregation of "Room". The prediction shows predicted cooling power usage for the individual room and the associated building number over the period of ten months. Total predicted power usage can be generated by aggregating the predicted power usage for the identified rooms.

Figure 5:
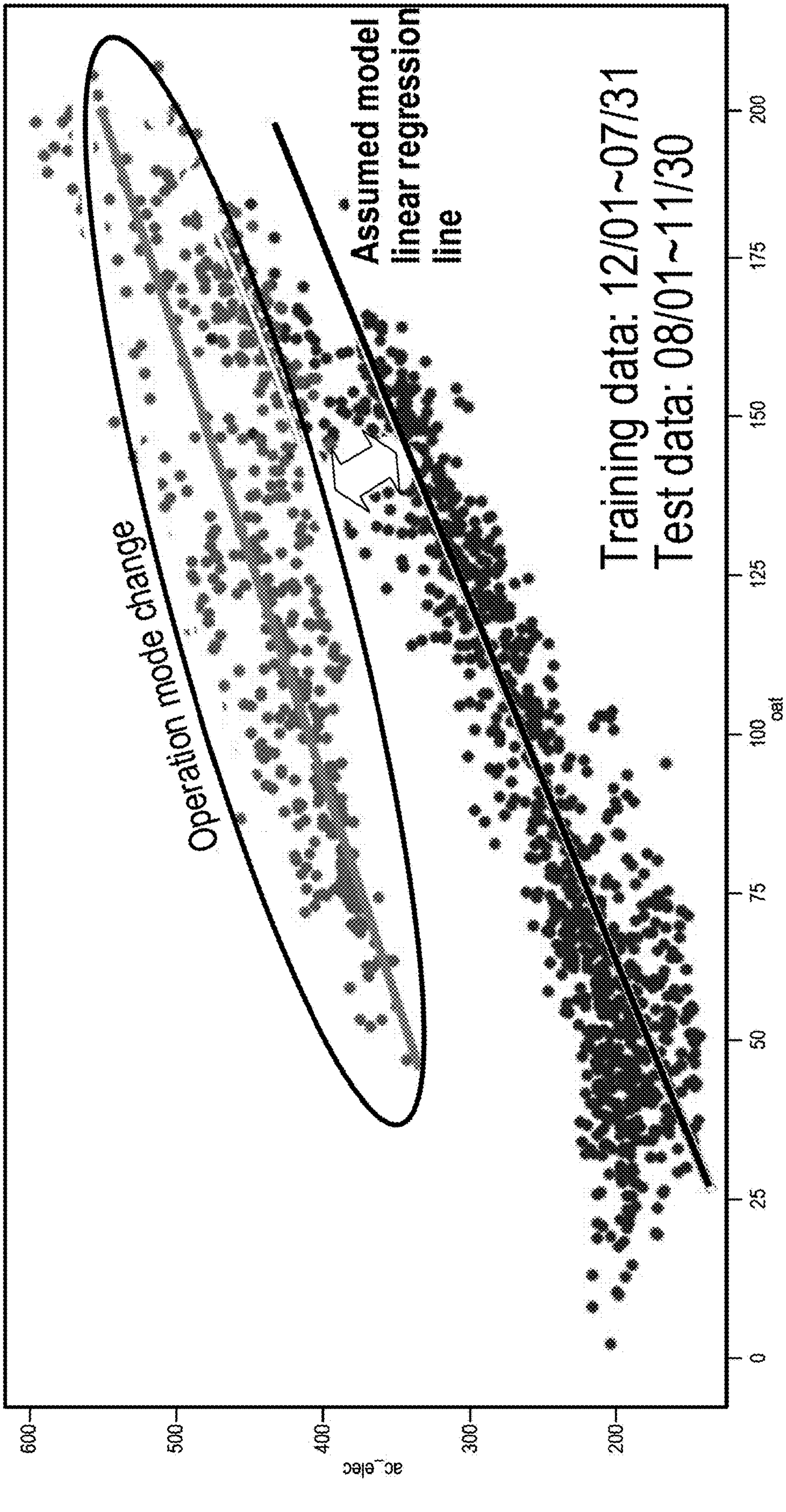
FIG. 5 illustrates an example "operation mode change" in cooling power data and changes in relationship with the outdoor air temperature.

FIG. 5 illustrates an example "operation mode change" in cooling power data and changes in relationship with the outdoor air temperature. In FIG. 5, the x-axis represents outdoor air temperature ("OAT") and the y-axis represents cooling power data ("ac_elec"). In this example, the 'what if' ML model is trained based on real valued training data of 8 months, from December 1$^{st}$ to July 31$^{st}$. However, an "operation mode change" occurred shortly after the training period (data shown as operation mode change), over the period August 1$^{st}$ to November 30$^{th}$, that resulted in inaccurate model predictions by the assumed model linear regression line of the trained ML model.

Figure 6:
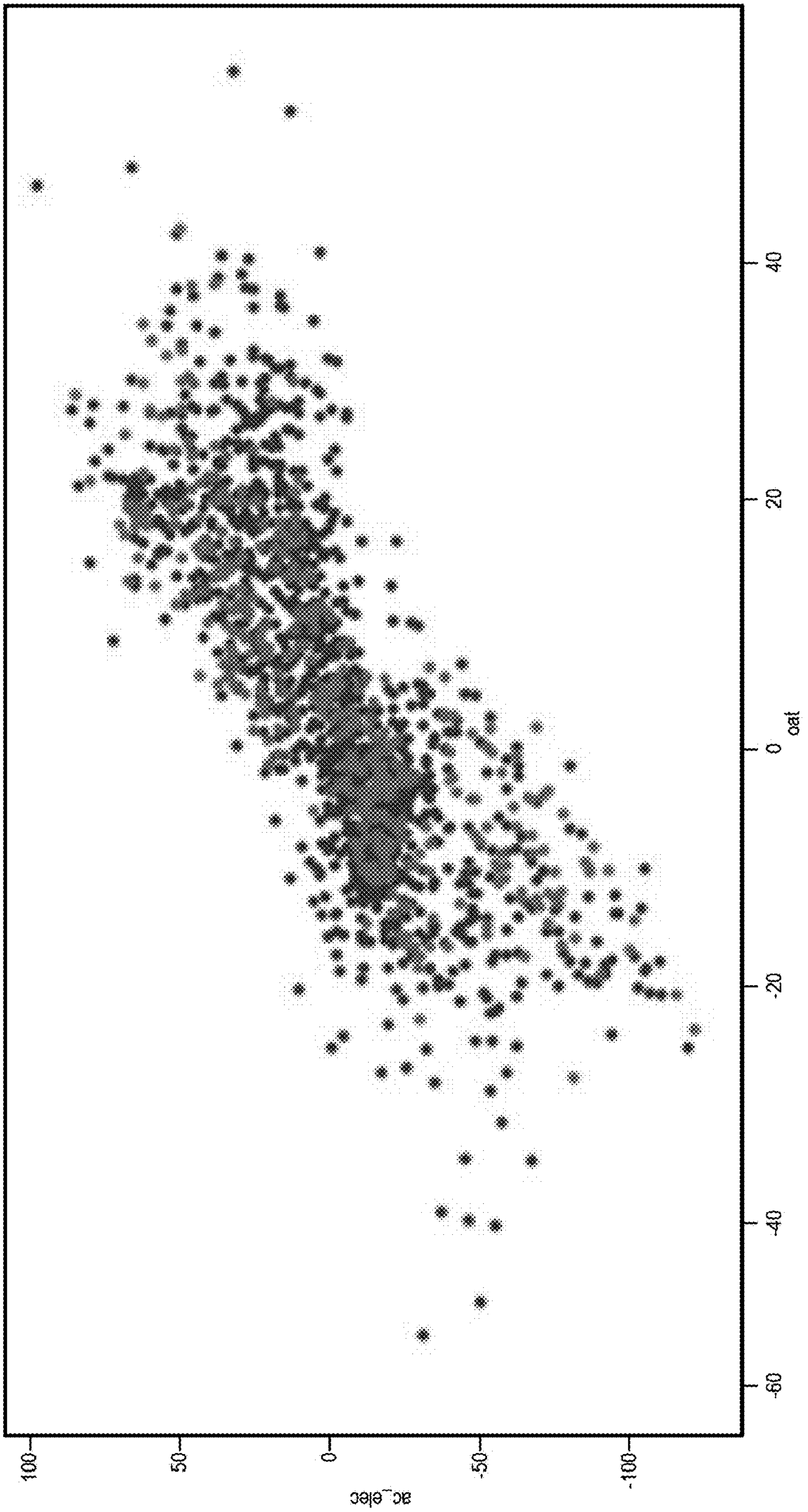
FIG. 6 illustrates a relationship between cooling power data and outdoor air temperature applying data differencing to the data of FIG. 5.

FIG. 6 illustrates a relationship between cooling power data and outdoor air temperature applying data differencing to the data of FIG. 5. As shown in FIG. 6, the ML model trained based on real value during the December 1$^{st}$ to July 31$^{st}$ period provides valid predictions to the data of the "operation mode change", resulting in overlapping of the two data groups. The differenced approach has the advantage of handling "operation mode change" by only adjusting the baseline to the shift when returning the differenced to real valued data. This can be done quicker than retraining a model based on new real valued data to handle the "operation mode change", since accumulation of new data would be necessary.

FIG. 7 illustrates performance test results for comparing ML modeling approaches with differenced data and direct data. The test results are measured in root mean squared error (RMSE). RMSE is used for evaluating the quality of predictions and showing how far the predictions fall from measured true values. Therefore, small RMSE values represent small errors and good performance of the model. As illustrated in FIG. 7, the training durations range between two to twelve months, and performance test is performed and observed with real-world test data. As observed, performance gap is especially large when the training data is limited (e.g. two months of training data). As shown in FIG. 7, with increase in available training data, the generated RMSEs tend to become smaller for both differenced approach and direct approach. However, the RMSE of the differenced approach performs better than the RMSE of the direct approach for all training durations.

Figure 8:
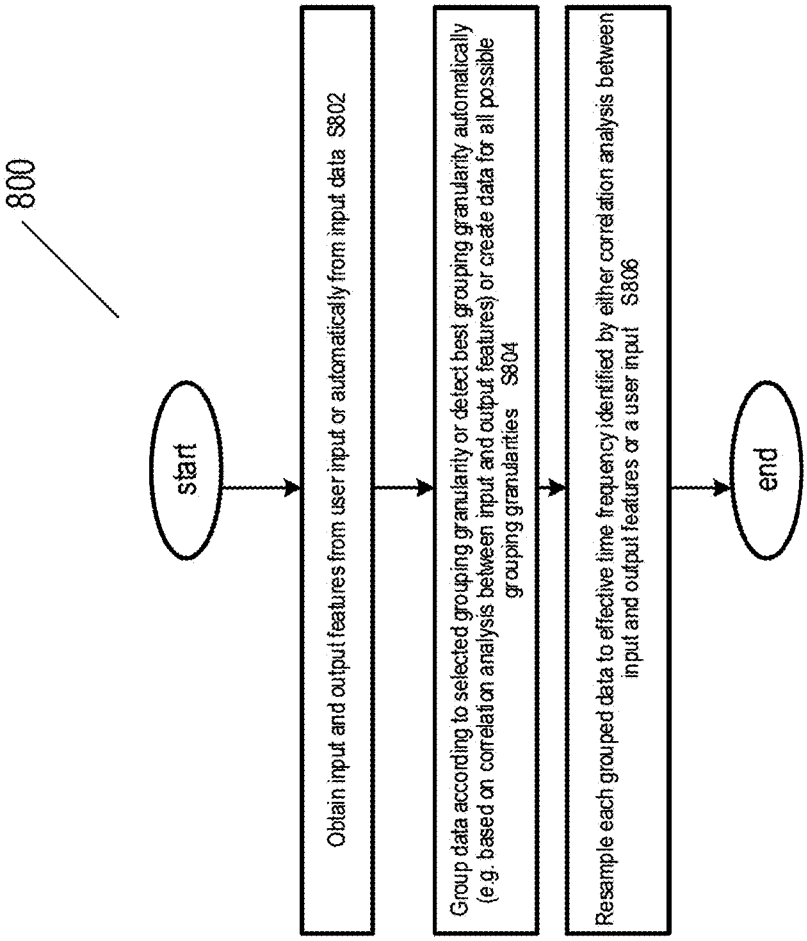
FIG. 8 is a flow chart representing process flow of a data preparator, in accordance with an example implementation.

FIG. 8 is a flow chart representing process flow of a data preparator 108, in accordance with an example implementation. The process 800 including obtaining input and output features from user input or automatically from input data at S802. The process 800 continues by grouping the internal data according to selected grouping granularity, detect best grouping granularity automatically, or create data for all possible grouping granularities at S804. At S806, each grouped data is resampled to an effective time frequency identified by either a correlation analysis between the input and output features or the user input. For the correlation analysis, each grouped data is for example, resampled to different time sampling frequencies that range from an hour to two days. The correlation between input and output features is calculated for each grouped data and a time sampling frequency having the best correlation distribution is identified and applied.

Figure 9:
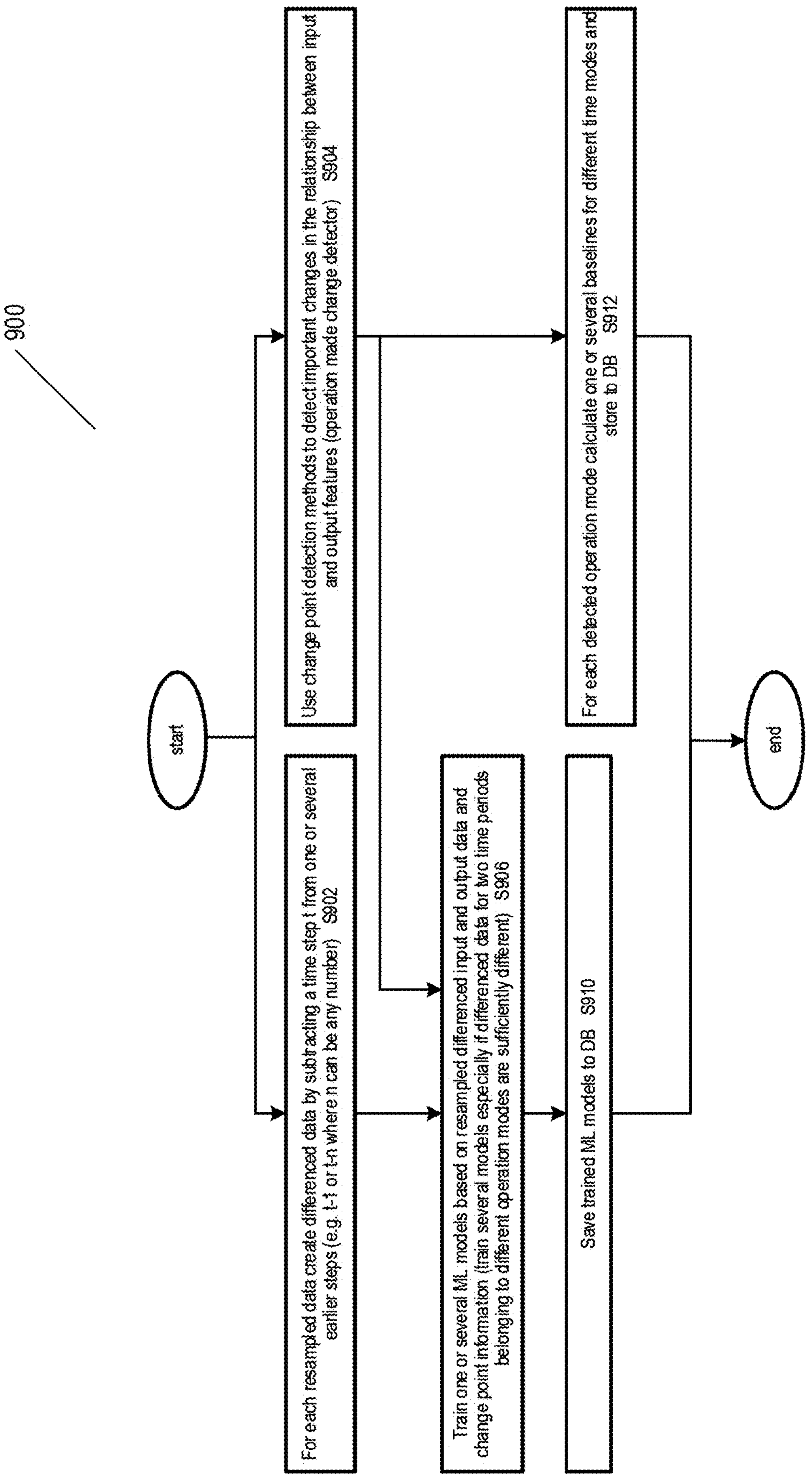
FIG. 9 is a flow chart representing process flow of a data differencing unit, a change point detector, a ML model regression, and a baseline calculator, in accordance with an example implementation.

FIG. 9 is a flow chart representing process flow of a data differencing unit 110, a change point detector 112, a ML model regression 114, and a baseline calculator 116, in accordance with an example implementation. The process 900 including, for each resampled data coming from the data preparator 108, creating differenced data by subtracting a time step t from one or more earlier time steps at S902. For example, difference between data at time step t and t−1: x(t)-x(t−1). Where training data for ML modeling is limited, available amount of data can be increased by difference between several time steps (e.g. x(t)−x(t−1), x(t)−x(t−2), and etc.) The data differencing is performed by the data differencing unit 110. At S904, change point detection methods are used to detect importance changes in the relationship between input and output features by the change point detector 112.

The process 900 continues by training one or more ML models based on resampled differenced input and output data, as well as the change point information at S906. More than one model can be trained if differenced data for two time periods belonging to different operations modes are sufficiently different. Retraining of ML model may be needed if detected changes from the change point detection methods are significant. In some example implementations, ML model is selected from different types of models and choosing the best performing model among the different model types. Model types may include but not limited to linear regression, DL model, Theil-sen regressor, and so on, in accordance with the desired implementation. In some example implementations, feature selection is considered by the different training models using the different input feature combinations or using correlation analysis to eliminate unrelated input features in relation to output feature.

At S910, the one or more trained ML models are stored to the database for future retrieval and use. At S912, one or more baselines are calculated and stored to the database. Possible baselines may include, but are not limited to, a date-based baseline created from past data (e.g. providing values for each date of a year), a holiday/workday baseline based on past data (e.g. providing values for workday and holiday), a seasonal baseline based on past data (providing values for seasonal pattern, e.g. weekly, daily, monthly, and so on), and a single baseline provision based on a single value (e.g. last value, average value, and so on)

FIG. 10 illustrates example internal data, in accordance with an example implementation. As shown in FIG. 10, internal data may include, but is not limited to, power grouping information table 1002, data management table 1004, power grouping relationship table 1006, data table 1008, and etc. The power grouping information table 1002 illustrates power grouping based on various grouping granularities. For example, under grouping type ID 2, room is the grouping granularity and associated information table is table A-2, which is discussed in detail below. The data management table 1004 illustrates the relationship between the various sensors and associated management information such as sensor type, grouping ID, data table ID, dependent feature, maximum value, and etc. For example, under sensor ID 1, the sensor is of the type that measures server power having a grouping ID of 1-1, with the associated data contained in data table D-1. Sensor ID 1 does not have a dependent feature and the maximum value is set at 500.

Power grouping relationship table 1006, which represents table A-2, illustrates relationship between grouping granularity and next layer ID associated with group ID. Taking group ID 1 for example, grouping granularity is on the level of room and identifies "Room I" for group ID 1. Next layer ID for group ID 1 has the ID number of 3-1, where "3" represents the grouping type ID number "3" for "Room Group" from the power grouping information table 1002, and "1" represents the group ID 1 identifying "Room Group 1" as it would be managed in other instance of the power grouping relationship table 1006 for the grouping granularity "Room Group".

Data table 1008, which represents table D-1, illustrates relationship tracked data and data unit in association with date and time. As shown in FIG. 10, the first entry in the data management table 1004 identifies sensor ID 1 as having corresponding sensor type of server power and refers to table D-1 under the "Data table ID" column. Taking datetime entry "2020-01-01 00:00:00" for example, the observed data value is 120 and the data unit is kWh. Thus, server power on Jan. 1, 2020, at 12 am is 120 kWh.

FIG. 1l illustrates example information stored at the data, ML model & baseline management DB 118, in accordance with an example implementation. As shown in FIG. 11, information may include but not limited to data management table 1102, model management table 1104, operation mode table 1106, difference data table 1108, baseline management table 1110, baseline value table 1112, and etc. The data management table 1102 illustrates data entries that are data grouped based on various grouping granularities. The data management table 1102 further illustrates operation mode and differenced data associated with the various data entry ID. For example, under data entry ID 1, room is the grouping granularity and associated operation mode table is TableO_01, with differenced data table of Table_001.

Operation mode table 1106, which represents TableO_01, illustrates relationship between operations modes and associated operation mode time frames, model IDs, and baseline IDs. Taking operation mode A for example, operation time frames associated with the mode are identified and listed. In addition, a model ID of 1 and baseline ID of 2 are shown as being associated with operation mode A. Numbers associated with the operation mode table 1106 under the "Model ID" column correspond to entries managed under the model management table 1104. Numbers associated with the operation mode table 1106 under the "Baseline ID" column correspond to entries managed under the baseline management table 1110.

Difference data table 1108, which represents Table_001, illustrates relationship between various differenced data features and time. Data features may include server power, outdoor air temperature, cooling power, indoor temperature, indoor humidity, outdoor humidity, and etc. The difference data table 1108 tracks the monitored differenced data features based on sampled time frequency and date. For example, entries in the difference data table 1108 are sampled at the 6-hour interval and tracked from Jan. 1, 2020 to Dec. 31, 2020.

From operation mode table 1106, a baseline ID can be identified that is associated with a baseline management table 1110. As shown in FIG. 11, the baseline management table 1110 illustrates a baseline type and a baseline value table ID that associate with the baseline ID. Baseline types may include holiday/workday, date-based, one-value, and etc. Whereas baseline value table ID tracks the baseline value table that associates with the specific baseline ID. For example, Base_Table_002 is associated with baseline ID 2.

Similarly, from operation mode table 1106, a model ID can be identified that is associated with a model management table 1104. The model management table 1104 manages trained models for a data group. As shown in FIG. 11, the model management table 1104 illustrates a model type, input features, and output features that associate with the model ID. Model types may include linear regression model, Theil-Sen Regressor, MLP, and etc. Taking model ID 1 for example, the model management table 1104 identifies input features of server power, outdoor air temperature and output feature of cooling power as associated with the model ID 1, which is a model of type linear regression.

From baseline management table 1110, a baseline value table ID of Base_Table_0002 can be identified that is associated with a baseline value table 1112. Baseline value table 1112, which represents Base_Table_002, illustrates relationship between various data features' baseline values and time. Data features may include server power, outdoor air temperature cooling power, indoor temperature, indoor humidity, outdoor humidity, and etc. The baseline value table 1112 tracks the baselines associated with data features based on featured time. For example, Base_Table_002 has a date-based featured time with 6-hour interval frequency equal to the 6-hour interval frequency of the entries in the difference table 1108.

Figure 12:
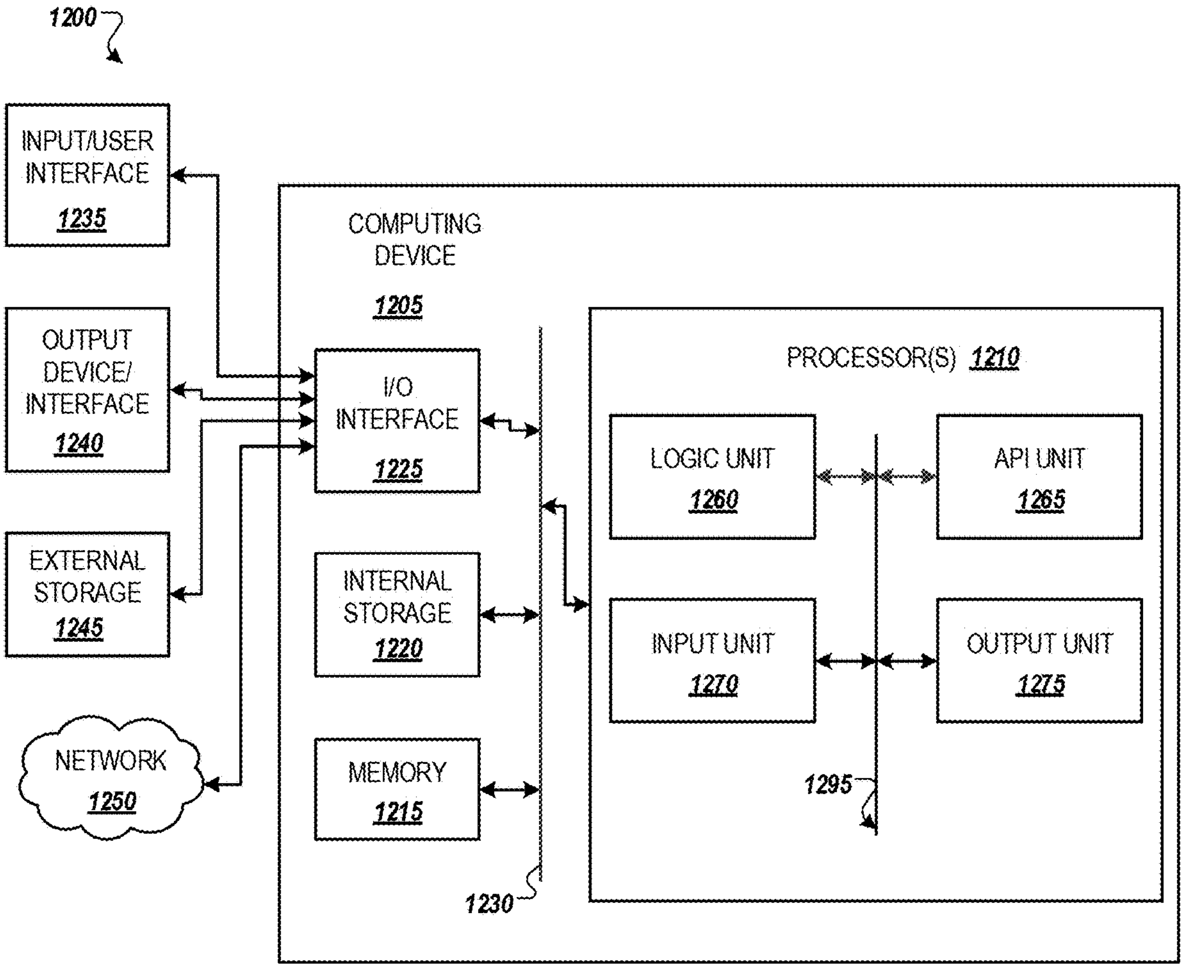
FIG. 12 illustrates an example computing environment with an example computer device suitable for use in some example implementations.

FIG. 12 illustrates an example computing environment with an example computer device suitable for use in some example implementations. Computer device 1205 in computing environment 1200 can include one or more processing units, cores, or processors 1210, memory 1215 (e.g., RAM, ROM, and/or the like), internal storage 1220 (e.g., magnetic, optical, solid-state storage, and/or organic), and/or IO interface 1225, any of which can be coupled on a communication mechanism or bus 1230 for communicating information or embedded in the computer device 1205. IO interface 1225 is also configured to receive images from cameras or provide images to projectors or displays, depending on the desired implementation.

Computer device 1205 can be communicatively coupled to input/user interface 1235 and output device/interface 1240. Either one or both of the input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via IO interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

IO interface 1225 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs) or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, the input unit 1270, the output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide an output based on the calculations described in example implementations.

Processor(s) 1210 can be configured to receive internal data and external data which affect output data. The processor(s) 1210 may also be configured to difference the internal data, the external data, and the output data to create first differenced data. The processor(s) 1210 may also be configured to train a machine learning model using the first differenced data. The processor(s) 1210 may also be configured to scenario input data as input to the machine learning model, wherein the scenario input data comprises conditional data input from a user and/or input data obtained from a separately simulated machine learning data change model, the conditional data input including at least one feature dimension associated with at least one of the internal data or the external data, and the input data including at least one feature dimension associated with at least one of the internal data or the external data. The processor(s) 1210 may also be configured to generate predicted output based on the scenario input data.

The processor(s) 1210 may also be configured to group the internal data based on select granularity, wherein the select granularity is based on available grouping information contained within the internal data. The processor(s) 1210 may also be configured to resampling the grouped internal data and the external data based on different sampling frequencies to establish correlation between the internal data, the external data, and the output data. The processor(s) 1210 may also be configured to identify a time sampling frequency having an optimal correlation distribution among the different sampling frequencies and using the identified time sampling frequency as sampling frequency to prepare the internal data, the external data, and the output data for training the machine learning model.

The processor(s) 1210 may also be configured to detect changes in relationship between the internal data, the external data, and the output data. The processor(s) 1210 may also be configured to determine whether retraining of a new machine learning model is needed based on the detected changes. The processor(s) 1210 may also be configured to difference the scenario input data using a plurality of baselines. The processor(s) 1210 may also be configured to calculate second differenced data using the plurality of baselines based on change points associated with the internal data, the external data, and the output data. The processor(s) 1210 may also be configured to generate the predicted output based on the second differenced data.

The processor(s) 1210 may also be configured to generate real value returned output through addition of the plurality of baselines to the predicted output. The processor(s) 1210 may also be configured to display the real value returned output through a graphic user interface (GUI), wherein the GUI generates graphic forecasts and output summaries based on the real value returned output. The processor(s) 1210 may also be configured to merge an additional external baseline of holiday information with the real value returned output to generate a true output. The processor(s) 1210 may also be configured to display the true output through a Graphic user interface (GUI), wherein the GUI generates graphic forecasts and output summaries based on the true output.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for generating simulations based on data, the method comprising:

receiving internal data and external data which affect output data;

differencing the internal data, the external data, and the output data to create first differenced data;

grouping the internal data based on select granularity, wherein the select granularity is based on available grouping information contained within the internal data;

resampling the grouped internal data and the external data based on different sampling frequencies to establish correlation between the internal data, the external data, and the output data;

training a machine learning model using the first differenced data;

identifying a time sampling frequency having an optimal correlation distribution among the different sampling frequencies and using the identified time sampling frequency as sampling frequency to prepare the internal data, the external data, and the output data for training the machine learning model;

receiving scenario input data as input to the machine learning model, wherein the scenario input data comprises conditional data input from a user and/or input data obtained from a separately simulated machine learning data change model, the conditional data input including at least one feature dimension associated with at least one of the internal data or the external data, and the input data including at least one feature dimension associated with at least one of the internal data or the external data; and generating predicted output based on the scenario input data.

2. The method of claim 1, wherein the differencing the internal data, the external data, and the output data to create the first differenced data comprises generating the differenced data of the internal data, the external data, and the output data based on time information, the differenced data is difference between data at a current time step and a prior time step.

3. The method of claim 1, further comprising:

detecting changes in relationship between the internal data, the external data, and the output data; and determining whether retraining of a new machine learning model is needed based on the detected changes.

4. The method of claim 1, further comprising:

differencing the scenario input data using a plurality of baselines;

calculating second differenced data using the plurality of baselines based on change points associated with the internal data, the external data, and the output data; and generating the predicted output based on the second differenced data.

5. The method of claim 4, further comprising:

generating real value returned output through addition of the plurality of baselines to the predicted output, wherein the differencing the scenario input data using the plurality of baselines is performed by subtracting the plurality of baselines from the scenario input data to generate the second differenced data.

6. The method of claim 5, further comprising displaying the real value returned output through a Graphic user interface (GUI), wherein the GUI generates graphic forecasts and output summaries based on the real value returned output.

7. The method of claim 5, further comprising:

merging an additional external baseline of holiday information with the real value returned output to generate a true output; and Displaying the true output through a Graphic user interface (GUI), wherein the GUI generates graphic forecasts and output summaries based on the true output.

8. The method of claim 1, wherein the predicted output comprises output information showing correlation between featured time associated with a data center's operation and predicted change in cooling power of the data center.

9. The method of claim 1, wherein:

the machine learning model simulates relationships between independent input features and dependent output feature;

the independent input features comprise internal room temperature, internal room humidity, external humidity, weather data, server heat, and server power consumption associated with a data center; and the dependent output features comprise cooling power consumption associated with the data center and speed of an AC motor or ventilator in associated with operation of the data center.

10. A non-transitory computer readable medium, storing instructions for generating simulations based on data, the instructions comprising:

receiving internal data and external data which affect output data;

differencing the internal data, the external data, and the output data to create first differenced data;

grouping the internal data based on select granularity, wherein the select granularity is based on available grouping information contained within the internal data;

resampling the grouped internal data and the external data based on different sampling frequencies to establish correlation between the internal data, the external data, and the output data;

training a machine learning model using the first differenced data;

identifying a time sampling frequency having an optimal correlation distribution among the different sampling frequencies and using the identified time sampling frequency as sampling frequency to prepare the internal data, the external data, and the output data for training the machine learning model;

receiving scenario input data as input to the machine learning model, wherein the scenario input data comprises conditional data input from a user and/or input data obtained from a separately simulated machine learning data change model, the conditional data input including at least one feature dimension associated with at least one of the internal data or the external data, and the input data including at least one feature dimension associated with at least one of the internal data or the external data; and generating predicted output based on the scenario input data.

11. The non-transitory computer readable medium of claim 10, wherein the differencing the internal data, the external data, and the output data to create the first differenced data comprises generating the differenced data of the internal data, the external data, and the output data based on time information, the differenced data is difference between data at a current time step and a prior time step.

12. The non-transitory computer readable medium of claim 10, further comprising:

detecting changes in relationship between the internal data, the external data, and the output data; and determining whether retraining of a new machine learning model is needed based on the detected changes.

13. The non-transitory computer readable medium of claim 10, further comprising:

differencing the scenario input data using a plurality of baselines;

calculating second differenced data using the plurality of baselines based on change points associated with the internal data, the external data, and the output data; and generating the predicted output based on the second differenced data.

14. The non-transitory computer readable medium of claim 13, further comprising:

generating real value returned output through addition of the plurality of baselines to the predicted output, wherein the differencing the scenario input data using the plurality of baselines is performed by subtracting the plurality of baselines from the scenario input data to generate the second differenced data.

15. The non-transitory computer readable medium of claim 14, further comprising displaying the real value returned output through a Graphic user interface (GUI), wherein the GUI generates graphic forecasts and output summaries based on the real value returned output.

16. The non-transitory computer readable medium of claim 14, further comprising:

merging an additional external baseline of holiday information with the real value returned output to generate a true output; and displaying the true output through a Graphic user interface (GUI), wherein the GUI generates graphic forecasts and output summaries based on the true output.

17. The non-transitory computer readable medium of claim 10, wherein the predicted output comprises output information showing correlation between featured time associated with a data center's operation and predicted change in cooling power of the data center.

18. The non-transitory computer readable medium of claim 10, wherein:

the machine learning model simulates relationships between independent input features and dependent output feature;

the independent input features comprise internal room temperature, internal room humidity, external humidity, weather data, server heat, and server power consumption associated with a data center; and the dependent output features comprise cooling power consumption associated with the data center and speed of an AC motor or ventilator in associated with operation of the data center.

* * * * *